US012312809B2

(12) United States Patent
Sudo et al.

(10) Patent No.: US 12,312,809 B2
(45) Date of Patent: May 27, 2025

(54) GYPSUM-BASED LOAD-BEARING BOARD, LOAD-BEARING WALL STRUCTURE, AND LOAD-BEARING WALL CONSTRUCTION METHOD FOR WOODEN CONSTRUCTION BUILDING

(71) Applicant: YOSHINO GYPSUM CO., LTD., Tokyo (JP)

(72) Inventors: Ushio Sudo, Tokyo (JP); Wataru Nakamura, Tokyo (JP); Tomoya Hasegawa, Tokyo (JP); Muneyoshi Nagano, Tokyo (JP); Masahiro Wada, Tokyo (JP); Katsumi Tada, Tokyo (JP); Yousuke Sato, Tokyo (JP); Daisuke Naito, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 93 days.

(21) Appl. No.: 17/995,164

(22) PCT Filed: Apr. 1, 2021

(86) PCT No.: PCT/JP2021/014227
§ 371 (c)(1),
(2) Date: Feb. 13, 2023

(87) PCT Pub. No.: WO2021/205993
PCT Pub. Date: Oct. 14, 2021

(65) Prior Publication Data
US 2024/0200330 A1 Jun. 20, 2024

(30) Foreign Application Priority Data

Apr. 6, 2020 (JP) .................................. 2020-068198

(51) Int. Cl.
*E04B 2/00* (2006.01)
*B32B 13/02* (2006.01)
(Continued)

(52) U.S. Cl.
CPC ................ *E04C 2/46* (2013.01); *B32B 13/02* (2013.01); *B32B 13/08* (2013.01); *E04C 2/043* (2013.01);
(Continued)

(58) Field of Classification Search
CPC . E04C 2/46; E04C 2/043; B32B 13/02; B32B 13/08
(Continued)

(56) References Cited

U.S. PATENT DOCUMENTS 5,749,187 A * 5/1998 Umehara .............. E04B 2/7457
52/407.3
9,802,866 B2 * 10/2017 Yu ........................... B32B 13/14
(Continued)

FOREIGN PATENT DOCUMENTS

JP H09-217476 8/1997
JP 2001-227086 8/2001
(Continued)

OTHER PUBLICATIONS

Allowable Stress Design of Wooden Framework Construction Method Housing [1] (2017 edition), pp. 63 and 300 to 301 with partial English translation.
(Continued)

*Primary Examiner* — Paola Agudelo
(74) *Attorney, Agent, or Firm* — IPUSA, PLLC

(57) ABSTRACT

The present invention is to provide a gypsum-based load-bearing board for wood structural load-bearing walls which is capable of increasing the co-efficient of effective wall length without additionally using reinforcement materials or
(Continued)

stiffening materials, and without increasing the specific gravity and/or the thickness of the gypsum-based load-bearing board. The gypsum-based load-bearing board for wood structural load-bearing walls includes a main member or a core member formed from a board-shaped hardened gypsum containing an inorganic fiber and an organic-based strength enhancer that exert a lateral nail resistance of 500 N or more, and a paper covering at least front and back sides of the main member or the core member to constitute the load-bearing board.

15 Claims, 6 Drawing Sheets

(51) Int. Cl.
*B32B 13/08* (2006.01)
*E04C 2/04* (2006.01)
*G01N 3/24* (2006.01)

(52) U.S. Cl.
CPC ............ *G01N 3/24* (2013.01); *B32B 2307/54* (2013.01); *B32B 2307/718* (2013.01); *B32B 2307/72* (2013.01); *B32B 2307/7376* (2023.05); *B32B 2607/00* (2013.01)

(58) Field of Classification Search
USPC ............................ 428/537.7, 294.7; 52/483.1
See application file for complete search history.

(56) References Cited

U.S. PATENT DOCUMENTS

| | | | |
|---|---|---|---|
| 10,195,765 B2* | 2/2019 | Yoshida | B28B 17/0081 |
| 10,968,624 B2* | 4/2021 | Niimi | C04B 24/12 |
| 11,598,089 B2* | 3/2023 | Ohuchi | E04B 2/58 |
| 2016/0096772 A1* | 4/2016 | Hotchin | E04C 2/043 |
| | | | 428/326 |
| 2016/0376191 A1* | 12/2016 | Li | B32B 13/14 |
| 2017/0073271 A1 | 3/2017 | Sudo et al. | |
| 2017/0267587 A1* | 9/2017 | Abolt | C04B 24/383 |
| 2018/0002233 A1* | 1/2018 | Yu | B32B 13/14 |
| 2018/0093448 A1* | 4/2018 | Marskell | B28B 23/0006 |
| 2019/0135695 A1* | 5/2019 | Leclercq | C04B 14/42 |
| 2019/0270675 A1* | 9/2019 | Harrison | C04B 28/144 |
| 2021/0040735 A1* | 2/2021 | Hasegawa | E04B 2/7457 |
| 2021/0299999 A1* | 9/2021 | Shake | B32B 5/20 |
| 2021/0309571 A1* | 10/2021 | Whittington | C04B 11/005 |
| 2022/0341070 A1* | 10/2022 | Yokoo | D04H 1/645 |
| 2022/0402240 A1* | 12/2022 | Randall | B32B 5/02 |
| 2022/0411330 A1* | 12/2022 | Blades | C09D 133/10 |
| 2023/0002974 A1* | 1/2023 | Hemphill | B32B 9/02 |

FOREIGN PATENT DOCUMENTS

| | | |
|---|---|---|
| JP | 2002-070239 | 3/2002 |
| JP | 2009-299460 | 12/2009 |
| JP | 2015-165087 | 9/2015 |
| JP | 2015-214050 | 12/2015 |
| WO | 2019/203148 | 10/2019 |

OTHER PUBLICATIONS

International Search Report for PCT/JP2021/014227 mailed on Jun. 1, 2021.
Written Opinion of the International Searching Authority for PCT/JP2021/014227 mailed on mailed on Jun. 1, 2021.
Office Action dated Dec. 28, 2022 with respect to the corresponding Saudi Arabian patent application No. 522440820.
Office Action mailed on Jun. 5, 2024 with respect to the corresponding Australian patent application No. 2021251557.

* cited by examiner

FIG.2
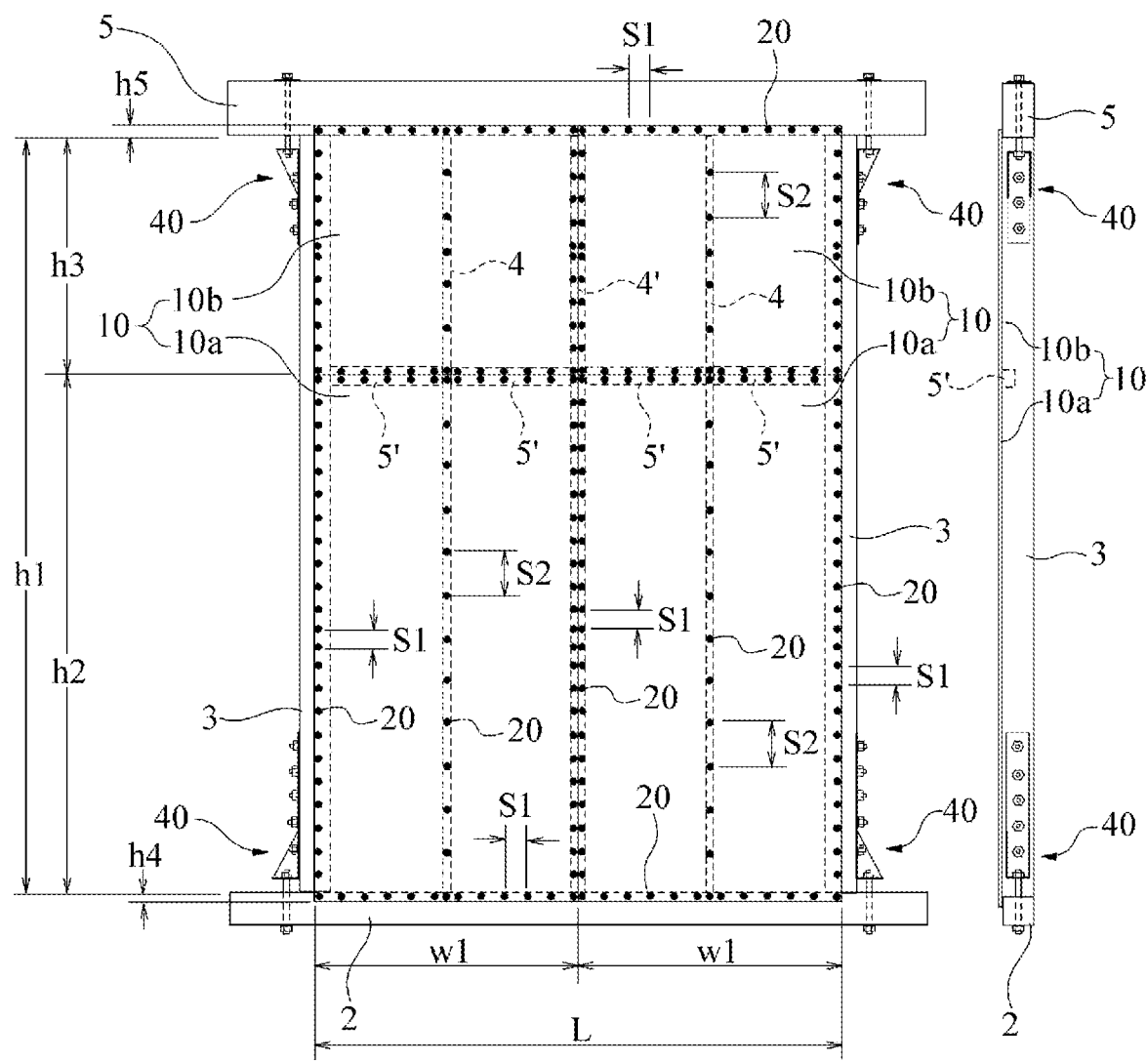
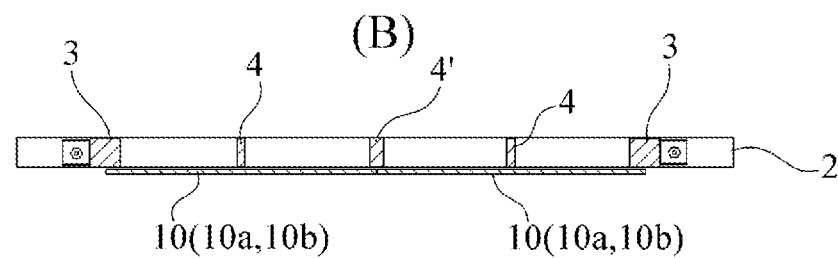

FIG.3

| | EXAMPLE 1 | EXAMPLE 2 | EXAMPLE 3 | EXAMPLE 4 | EXAMPLE 5 | COMPARATIVE EXAMPLE |
|---|---|---|---|---|---|---|
| SURFACE DENSITY OR SURFACE WEIGHT (kg/m²) | 7.7 | 7.7 | 8.7 | 7.3 | 7.9 | 9.8 |
| SPECIFIC GRAVITY | 0.79 | 0.78 | 0.89 | 0.74 | 0.96 | 1.00 |
| THICKNESS | 9.73 | 9.84 | 9.73 | 9.84 | 8.20 | 9.78 |
| ORGANIC STRENGTH ENHANCER (CALCINED GYPSUM RATIO) PARTS BY MASS | 2.4 | 2.4 | 1.5 | 11.8 | 1.5 | 0.8 |
| INORGANIC FIBER (CALCINED GYPSUM RATIO) PARTS BY MASS | 4.0 | 4.0 | 3.0 | 3.6 | 1.5 | 1.5 |
| LATERAL NAIL RESISTANCE (N) | 631 | 598 | 750 | 593 | 504 | 985 |
| YIELD STRENGTH $P_y$ (kN) | 11.1 | 10.3 | 12.0 | 9.0 | 8.6 | 10.4 |
| ULTIMATE STRENGTH (CORRECTION VALUE) $P_u'$ (kN) | 10.7 | 9.9 | 10.4 | 8.7 | 8.0 | 7.6 |
| ULTIMATE DISPLACEMENT $\delta_{u2}$ ($\times 10^{-3}$ rad) | 33.1 | 36.0 | 28.1 | 32.3 | 26.8 | 20.0 |

FIG.4
(A)
(COMPARATIVE EXAMPLE)
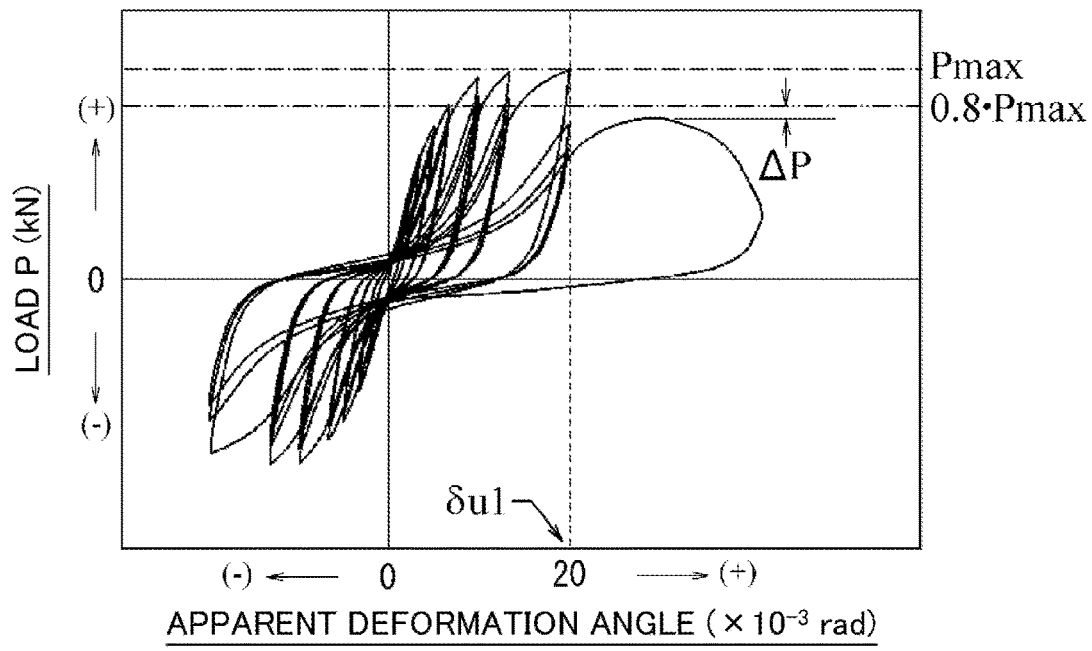
(B)
(EXAMPLE 1)
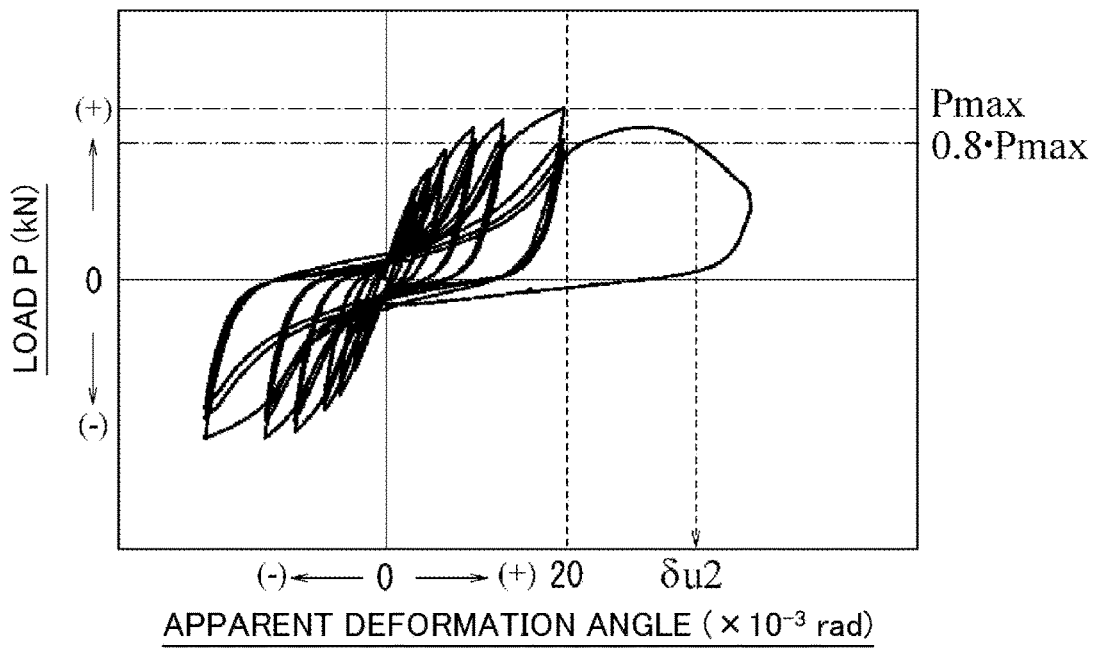

FIG.5

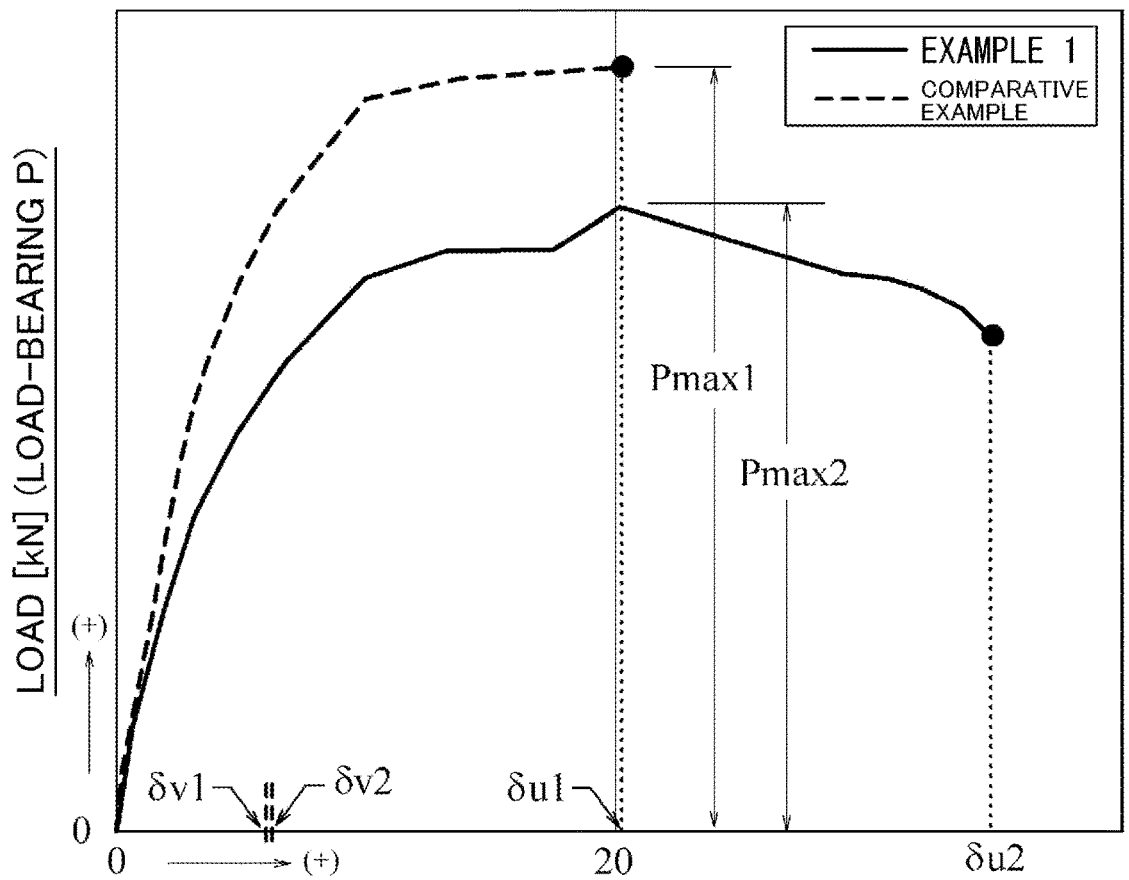

| | SURFACE DENSITY | ULTIMATE DISPLACEMENT | SHORT-TERM REFERENCE SHEAR STRENGTH | CO-EFFICIENT OF EFFECTIVE WALL LENGTH |
|---|---|---|---|---|
| EXAMPLE 1 | 7.7 kg/m² | $\delta u2 = 33.1$ | $P_0 = 10.7$ kN | 2.25 |
| COMPARATIVE EXAMPLE | 10.0 kg/m² | $\delta u1 = 20.0$ | $P_0 = 7.6$ kN | 1.60 |

$P_0 = \beta \times P_u'$ $P_u' = P_u \times 0.2\sqrt{2\mu - 1}$ $\mu = \dfrac{\delta u}{\delta v}$ $P_a = P_0 \times \alpha$ CO-EFFICIENT OF EFFECTIVE WALL LENGTH $= \dfrac{P_a}{L \times 1.96 \text{ (kN/m)}}$

*ASSUME REDUCTION COEFFICIENT $\alpha = 0.75$.
*ASSUME VARIATION COEFFICIENT $\beta = 1.0$.

$P_a$: SHORT-TERM ALLOWABLE SHEAR STRENGTH
$P_0$: SHORT-TERM REFERENCE SHEAR STRENGTH
$P_u'$: ULTIMATE STRENGTH (CORRECTION VALUE)
$P_u$: ULTIMATE STRENGTH
$\mu$: PLASTICITY
$\delta u$: ULTIMATE DISPLACEMENT ($\times 10^{-3}$ rad)
$\delta v$: YIELD POINT DISPLACEMENT ($\times 10^{-3}$ rad)
$\alpha$: REDUCTION COEFFICIENT
$\beta$: VARIATION COEFFICIENT
L: LENGTH OF TEST PIECE (TEST WALL) (m)

GYPSUM-BASED LOAD-BEARING BOARD, LOAD-BEARING WALL STRUCTURE, AND LOAD-BEARING WALL CONSTRUCTION METHOD FOR WOODEN CONSTRUCTION BUILDING

TECHNICAL FIELD

The present invention relates to a gypsum-based load-bearing board, a load-bearing wall structure, and a load-bearing wall construction method for a wooden construction building. More specifically, the present invention relates to a gypsum-based load-bearing board, a load-bearing wall structure, and a load-bearing wall construction method that are configured so that co-efficient of effective wall length ("Kabe-bairitsu") can be increased without relying on an increase in the maximum load-bearing strength of the board itself, or without relying on providing additional reinforcement materials or stiffening materials.

BACKGROUND OF THE INVENTION

As a construction method of a relatively small-scale building such as a house building and the like, a wooden framework construction method having a long history, a framework wall construction method of a wall structure that spread in use after the 1970's, a steel framework construction method that spread in use after 1960's, and a steel house construction method being widespread in Japan in recent years have been known. The wooden framework construction method is a method of constructing a wood frame structure by assembling square cross section timbers as posts and beams, and is the most widespread conventional construction method in Japan. The framework wall construction method, also called the two-by-four construction method, is "a method of constructing walls and floor slabs by nailing structural plywood or other similar materials onto a timber frame" (Notification No. 1540 and 1541, 2002, Ministry of Land, Infrastructure, Transport and Tourism of Japan). The steel frame construction method is a method of constructing steel structural frames by assembling steel members that constitute columns, beams, and braces. Conceptually, the steel house construction method consists of replacing the wooden framing members of the framework wall construction method with lightweight shaped steel, and is a steel structural frame wall construction method specified in the "Thin Sheet Lightweight Steel Construction" (2001, Notification No. 1641, Ministry of Land, Infrastructure, Transport and Tourism of Japan). As another structure related to a small-scale building, a rigid-frame structure or a reinforced concrete structure having a wall structure is known.

While such a wide variety of structures are known as small-scale buildings in Japan, the following is a description of the seismic performance of wood buildings as a technology relevant to the present invention.

In general, construction methods for wooden construction buildings are broadly classified into a wooden framework construction method and a framework wall construction method. Due to the effects of recent large-scale earthquakes, research on the seismic resistance of wooden construction buildings has been attracting particular attention in Japan in recent years. In architectural design practice in Japan, the axial length of structurally effective load-bearing walls (length of walls in a building plan) is generally used as an indicator of the strength of wooden construction buildings to resist short-term horizontal loads (seismic force, wind pressure, etc.) (Patent Document 1: Japanese Patent Application Laid-Open No. 2001-227086). The co-efficient of effective wall length ("Kabe-bairitsu") corresponding to the structure of the load-bearing wall is used to calculate the length of the frame assembly. The co-efficient of effective wall length is an indicator of the seismic performance or bearing capacity of the load-bearing wall, and the higher the value, the greater the seismic strength. When a specific number of load-bearing walls should be adopted for design purposes, a load-bearing wall structure with a relatively high co-efficient of effective wall length can improve the seismic resistance of the entire building. The strength of a wooden construction building to withstand short-term horizontal loads is proportional to the co-efficient of effective wall length of the load-bearing wall multiplied by the wall length. In ordinary building design, it is necessary to ensure that the amount of existing walls (length of load-bearing walls×co-efficient of effective wall length) exceeds the required amount of walls in both the beam-to-beam and girder directions. In general, the use of a load-bearing wall structure with a relatively large co-efficient of effective wall length reduces the number of load-bearing walls (number of installation points) and improves the degree of freedom in the overall design of the building, while the use of a load-bearing wall structure with a relatively small co-efficient of effective wall length increases the number of load-bearing walls (number of installation points) and reduces the degree of freedom in the overall design of the building. Thus, a wall structure with a high co-efficient of effective wall length is advantageous in improving the design freedom and seismic resistance of the entire building.

The co-efficient of effective wall length of general-purpose wooden structural load-bearing walls that have been used in Japan for many years is specified in Article 46 of the Building Standard Law Enforcement Order and in Notification No. 1100 of the Ministry of Construction (Jun. 1, 1981). On the other hand, for many load-bearing walls in recent years that do not belong to such general-purpose wall structures, it is necessary to determine the co-efficient of effective wall length based on the approval of the Minister of Land, Infrastructure and Transportation as specified in Table 1 (viii) of Paragraph 4 of the same article. For this reason, it is necessary to set the co-efficient of effective wall length of many recently constructed wooden structural load-bearing walls based on performance tests conducted by designated performance evaluation agencies, and the test methods for these performance tests are described in detail in the "Performance Test and Evaluation Methodology for Wood-Frame Load-bearing walls and Their Co-efficient of effective wall length" published by the respective testing and inspection agencies.

As described in many references, such as "Performance Test and Evaluation Methodology for Wood-Frame Load-bearing walls and Their Co-efficient of effective wall length", the performance test for determining the co-efficient of effective wall length of wooden structural load-bearing walls is an in-plane shear test of the load-bearing walls. In this test, a predetermined horizontal load is repeatedly applied to the test piece of the load-bearing wall, and the relationship between the horizontal load (P) and the shear deformation angle (δ) is determined. The co-efficient of effective wall length is the value obtained by calculating the short-term allowable shear strength (Pa) based on the horizontal load and shear deformation angle, and dividing the short-term allowable shear strength (Pa) by a predetermined load strength (wall length L(m)×1.96 (kN/m)), as described in the "Allowable Stress Design for Wooden Framework Construction Method Housing [1] (2017 edition)", p. 63 and p. 300 (Non-Patent Document 1) (indicated as a mathematical formula in FIG. 5). Thus, the co-efficient of effective wall length is the indexed value of the short-term allowable shear strength (Pa) divided by this reference value (1.96 L). Here, the short-term allowable shear strength (Pa), which is the basis for the calculation of the co-efficient of effective wall length factor, is, in principle, the value obtained by multiplying the smallest of the following four indices (the value obtained by multiplying each of the measured values obtained in the in-plane shear test by the coefficient of variation) (that is, the short-term reference shear strength ($P_0$)) by a predetermined reduction coefficient ($\alpha$) (factor for evaluating the factor for reducing the load-bearing).

(1) Yield strength (Py)
(2) Ultimate strength (Pu) adjusted based on plasticity ($\mu$) (hereinafter referred to as "ultimate strength (correction value) (Pu'))
(3) ⅔ of maximum load-bearing strength (Pmax)
(4) Load-bearing when shear deformation angle=1/120 rad (for non-loading type or loading type)

On the other hand, a "structural gypsum board" is known as a gypsum-based board that can be suitably used as a load-bearing board for wooden structural load-bearing walls. The "structural gypsum board" is a gypsum board having enhanced side resistance of the "Reinforced gypsum board" based on the applicant's conventional technique described in Japanese Patent No. 56422948 (Patent Document 3). The lateral nail resistance is the shear resistance or shear strength of the nailed portion of the board measured by the measurement method specified in JIS A 6901. FIG. 6 is a perspective view illustrating an overview of the lateral nail resistance test. As specified in JIS A 6901, the lateral nail resistance test for determining the lateral nail resistance is performed by using a 150 mm×75 mm test piece 100 taken from the board to be tested, drilling a through hole 102 of 2.6 mm in diameter with a drill at a position on a center line of the test piece 100 at a distance of 12 mm longitudinal from one end (upper end) 103 of the longitudinal direction of the test piece 100, inserting a steel round rod 101 (2.6 mm in diameter, approximately 40 mm in length) into the through hole 102, maintaining the surface (center surface) of the test piece 100 in a generally vertical state, maintaining the round rod 101 in a horizontal state, fixing the longitudinal end (lower end) of the test piece, and applying a load FV to the round rod 101 to raise the round rod 101 at a rate of approximately 6 mm/minute. In this test, the test piece 100 is broken by a local load acting on the through hole 102 of the test piece 100 from the round rod 101 with upward displacement of the round rod 101. The value of the lateral nail resistance is that the strength (load) of the test piece 100 is broken. A similar test for lateral nail resistance is provided in ASTM, but the invention is specified here based on the value of lateral nail resistance obtained by the test method for lateral nail resistance test specified in JIS A 6901.

The structural gypsum board is currently specified in JIS A 6901 as a gypsum-based board having a side resistance of 750 N or more (class A) or 500 N or more (class B). Generally, structural gypsum boards require a thickness of 12.5 mm or more and a specific gravity of 0.75 or more, thus wooden structural load-bearing walls fastened to structural gypsum boards require a surface density of at least about 9.4 kg/m² or a surface weight (the mass of the load-bearing board per unit area of the wall). Wooded structural load-bearing walls using structural gypsum board as the load-bearing board exhibit a relatively higher co-efficient of effective wall length than wooden structural load-bearing walls using (regular) gypsum board or reinforced gypsum board as the load-bearing board.

In general, the short-term reference shear strength ($P_0$) of the structural gypsum board is specified by the yield strength (Py) of the four indices above. Since the co-efficient of effective wall length is the value obtained by multiplying the short-term reference shear strength ($P_0$) by the reduction coefficient ($\alpha$) and dividing by the specified load-bearing, the co-efficient of effective wall length of the structural gypsum board is proportional to the yield strength (Py).

Structural gypsum board is a load-bearing board limited to installation on interior walls, and structural gypsum board is not permitted to be installed as a load-bearing board on exterior wooden exterior walls. On the other hand, Patent No. 6412431 (Patent Document 2) discloses a gypsum plate developed by the applicant as a gypsum-based load-bearing board that can be applied to outdoor wooden exterior walls, in which an organopolysiloxane compound is contained in the gypsum core as a load-bearing deterioration inhibitor. Gypsum plate developed by combining the technology described in Patent Document 2 and the technology in Patent Document 3 (Japanese Patent No. 5642948), which increases the shear resistance or shear strength of the nailed portion of the board, is already in practical use in Japan under the product name "Tiger EX Board" (registered trademark, manufactured by Yoshino Gypsum Co. Ltd.) This gypsum plate (hereinafter may also be called "EX Board") is configured by 9.5 mm in thick, 910 mm in width, 3030 mm in height, 26 kg in weight. The EX Board requires a specific gravity of approximately 1.0 to achieve the desired maximum load (maximum bearing stress (Pmax)) in an in-plane shear test. Therefore, a wooden structural load-bearing wall fastened with EX boards also requires a surface density or surface weight of at least about 9.4 kg/m².

The short-term reference shear strength ($P_0$) of the EX board is specified by the ultimate strength (correction value) (Pu') of the four indices above. This is due to the fact that the ultimate strength (correction value) (Pu') is the smallest of the above four indices as a result of the increase in the yield strength (Py).

The ultimate strength (correction value) (Pu') is specifically the value obtained by the following equation based on the ultimate strength (Pu) and the plasticity ($\mu$) measured by the in-plane shear test, and the short-term reference shear strength ($P_0$) is the value obtained by the following equation based on the ultimate strength (correction value) (Pu') and the coefficient of variation ($\beta$) of the measured value.

$$Pu' = Pu \times 0.2 \times (2\mu - 1)^{1/2}$$

$$P_0 = \beta \times Pu'$$

Thus, although an increase in the ultimate strength (Pu) is beneficial in increasing the co-efficient of effective wall length of the bearing wall, the ultimate strength (Pu) generally has the property of increasing with an increase in the maximum load (Pmax) that the board can tolerate in an in-plane shear test. Therefore, according to the knowledge and technical knowledge of the present inventors, the past research and development that increases the short-term reference shear strength ($P_0$) of the a gypsum-based load-bearing board is mainly intended to increase the value of the maximum load (Pmax) measured in the in-plane shear test and indirectly increase the ultimate strength (Pu), and not intended to increase the ultimate strength (Pu) in relation to the ultimate displacement (δu) and the plasticity (μ).

In this specification, the gypsum-based board not specified in JIS A 6901 (gypsum board product) is referred to as a "gypsum plate", whether the gypsum-based board with a gypsum core portion (core material portion) is exposed on the outer surface or outer layer or the gypsum-based board consisting of the outer surface or outer layer of the gypsum core portion is covered with gypsum board base paper.

The EX board exhibits the maximum load-bearing strength to withstand the relatively high maximum load in the above performance test to determine the co-efficient of effective wall length of the wooden structural load-bearing walls. However, when the shear deformation angle is slightly increased after the maximum load (maximum load-bearing strength) is obtained at the specified shear deformation angle, punching out, breaking, cracking, or the like of the board causes the load to drop rapidly or shear fracture early (e.g., Comparative Example illustrated in FIGS. 4(A) and 5). As a result, the ultimate strength (correction value) of the EX board (Pu') significantly decreased and the co-efficient of effective wall length decreased. In order to overcome this problem, as a measure to increase the ultimate strength (correction value) (Pu') and increase the co-efficient of effective wall length, a method of reinforcing board is known to be used in which a reinforcing material such as a metal plate or a stiffener is arranged in a nailed portion to prevent breakage or fracture of the nailed portion (International Patent Publication No. WO 2019/203148A1 (Patent Document 4)).

According to the wooden structural load-bearing wall using such reinforcement or stiffening material, it is believed that it is possible to construct a wooden structural load-bearing wall that demonstrates a relatively high co-efficient of effective wall length by increasing the aforementioned ultimate strength (correction value) (Pu') by improving the toughness and the deformation tracking of the load-bearing board, without relying on an increase of the maximum load in which the board can bear in the above performance test.

RELATED ART DOCUMENTS

Patent Document

Patent Document 1: Japanese Patent Application Laid-Open No. 2001-227086
Patent Document 2: Japanese Patent No. 6412431
Patent Document 3: Japanese Patent No. 5642948
Patent Document 4: International Patent Publication No. WO2019/203148A1

Non-patent Document

Non-Patent Document 1: Allowable Stress Design of Wooden Framework Construction Method Housing [1] (2017 edition), pages 63 and 300

SUMMARY OF THE INVENTION

Problems to be Solved by the Invention

However, according to the load-bearing wall structure (Patent Document 4) of which the ultimate strength (correction value) (Pu') is increased by using the aforementioned reinforcement or stiffener, the step of using the reinforcement or stiffener additionally to the surface of the load-bearing board is added to the construction process of board, or such a step should be additionally performed at the time of construction of the wood structural load-bearing walls. This type of process can complicate the gypsum-based board construction process or cause a deterioration in the workability of the construction work.

On the other hand, in order to increase the co-efficient of effective wall length of the wooden structural load-bearing walls using gypsum-based board as the load-bearing board without depending on the reinforcement materials or stiffening materials, it is considered necessary to increase the specific gravity and/or the plate thickness of the gypsum-based board and increase the maximum load-bearing strength of the gypsum-based board. As described above, the EX board has a weight of about 26 kg in its standard dimension (about 910 mm in width and about 3,030 mm in height). Therefore, in view of the fact that the load-bearing board is fixed to the wall base of the wooden structural load-bearing walls by hand, it is very difficult in practice to further increase the specific gravity and/or plate thickness of the EX board and the structural gypsum board, from the viewpoint of workability of the wooden structural load-bearing walls.

The present invention has been made in view of such problems. An object of the present invention is to provide a gypsum-based load-bearing board for wooden structural load-bearing walls which is capable of increasing the co-efficient of effective wall length without additionally using reinforcement materials or stiffening materials, and without increasing the specific gravity and/or the thickness of the gypsum-based board.

Another object of the present invention is to provide a load-bearing wall structure and a load-bearing wall construction method for wood buildings using such a gypsum-based board as a load-bearing board.

Furthermore, another object of the present invention is to provide a method of increasing a co-efficient of effective wall length of a wooden structural load-bearing wall which is capable of increasing the co-efficient of effective wall length without relying on the effects of reinforcement or stiffness by reinforcement materials or stiffening materials that are additionally provided on the gypsum-based board and without relying on increasing the specific gravity and/or the plate thickness of the gypsum-based board.

Means for Solving the Problem

In order to achieve the above-described object, the present invention relates to a gypsum-based load-bearing board of wooden load-bearing wall fastened to a wooden wall base used in a wooden framework construction method or a framework wall construction method by a fastener, the gypsum-based load-bearing board including a main member or a core member formed from a board-shaped hardened gypsum containing an inorganic fiber and an organic-based strength enhancer that exert a lateral nail resistance of 500 N or more, and a paper covering at least front and back sides of the main member or the core member to constitute the load-bearing board, wherein a surface density or a surface weight of the load-bearing board specified as a mass per unit area of the wall surface is in a range from 6.5 kg/m$^2$ to 8.9 kg/m$^2$, wherein an ultimate displacement (δu2) of the load-bearing wall measured by an in-plane shear test using a test piece with a wall length of 1.82 m is greater than $20 \times 10^{-3}$ rad (δu2), and wherein a correction value (Pu') is greater than 7.6 kN as the correction value (Pu') of an ultimate strength (Pu) determined based on the ultimate strength (Pu)

and a plasticity ($\mu$) of the load-bearing wall measured by the in-plane shear test (claim 13).

According to the gypsum-based load-bearing board of the present invention, the minimum physical properties (lateral nail resistance: 500 N or more) of the gypsum-based load-bearing board is secured by mixing the inorganic fibers and the organic-based strength enhancer, while the surface density of the board is rather reduced to a relatively low value (6.5 kg/m$^2$ to 8.9 kg/m$^2$). In the following description, "minimum physical property" means a lateral nail resistance of 500 N or more.

The above-mentioned surface density value (6.5 kg/m$^2$ to 8.9 kg/m$^2$) is smaller than the surface density of the structural gypsum board and EX board (about 9.4 kg/m$^2$). Therefore, the conditions of the present invention are contradictory to the conventional method which increases the short-term reference shear strength ($P_0$) (that is, the conventional method increases the maximum load-bearing strength (maximum load (Pmax)) by increasing specific gravity and/or plate thickness, thereby, increasing the short-term reference shear strength ($P_0$)). This was assumed to be a configuration that would result in a reduction of the co-efficient of effective wall length under the conventional concept of increasing the co-efficient of effective wall length. However, when the surface density is reduced while maintaining the minimum physical properties (lateral nail resistance: 500 N or more) as a gypsum-based load-bearing board, the toughness and the deformation tracking that gypsum-based load-bearing boards potentially possess become apparent. As a result, the ultimate displacement ($\delta u$) and the plasticity ($\mu$) are increased, and the ultimate strength (correction value) (Pu') is increased. Therefore, the short-term reference shear strength ($P_0$) can be increased without necessarily increasing the maximum load-bearing strength (maximum load (Pmax)). As noted above, the value of the short-term reference shear strength ($P_0$) is proportional to the co-efficient of effective wall length value, and the increase of the ultimate displacement ($\delta u$) and the plasticity ($\mu$) that results in the increase of the short-term reference shear strength ($P_0$) is an effective factor in increasing the co-efficient of effective wall length. Thus, according to the gypsum-based load-bearing board of the present invention, the co-efficient of effective wall length can be increased without increasing the specific gravity and/or the plate thickness of the gypsum-based load-bearing board without additionally using the reinforcement materials or the stiffening materials by increasing the ultimate strength (correction value) (Pu') while obtaining the minimum physical properties of the gypsum-based board. As with the structural gypsum board and the EX board, at least the front and the back sides of the main material or the core material are covered with a paper. Therefore, the above-described load-bearing board can be easily manufactured on a conventional gypsum board manufacturing line. The term "front and back surfaces" means the surfaces and back surfaces of the board, excluding the edge or side surfaces of the edge and side edges (i.e., the four outer circumferential edges) of the board.

Preferably, the thickness of the gypsum-based load-bearing board is set to be less than 12 mm (more preferably 10 mm or less (8.5 mm or more)), for example, 9.5 mm or 9.0 mm. The gypsum-based load-bearing board of such thickness is advantageous for reducing the wall thickness of the wooden structural load-bearing walls compared to the structural gypsum boards that require a plate thickness of 12 mm or more. If desired, the hardened gypsum has a lateral nail resistance of 980 N or less.

Preferably, the specific gravity of the gypsum-based load-bearing board is set to be 0.96 or less (0.65 or more), preferably 0.9 or less (more preferably 0.8 or less). The gypsum-based load-bearing board of the specific gravity can reduce the weight of the board compared to an EX board having a specific gravity of 1.0 or more. Therefore, it is advantageous for reducing the weight of the wooden structural load-bearing walls or improving the workability of the wooden structural load-bearing walls or their construction work.

In the preferred embodiment of the present invention, the core material (the gypsum core portion) of the gypsum-based load-bearing board contains an organopolysiloxane compound as an anti-degradation agent to prevent deterioration of the load-bearing strength. Such a load-bearing board can provide the aforementioned load-bearing board that can be applied to the exterior wall of the wooden exterior wall similar to the EX board.

The present invention also provides a wooden structural load-bearing wall (claim 1) having a structure in which gypsum-based load-bearing board is fastened to a wooden of a wooden framework construction method or a framework wall construction method by means of nails, screw screws, or other fasteners. According to the wooden structural load-bearing wall, it is possible to increase the short-term reference shear strength ($P_0$) by improving the toughness and the deformation tracking of gypsum-based boards and reducing the specific gravity and/or the plate thickness of the gypsum-based board, thereby reducing the self-weight of the load-bearing wall or reducing the wall thickness. The ultimate displacement ($\delta u$) obtained by the in-plane shear test of such load-bearing wall structure is greater than a value of at least $20 \times 10^{-3}$ rad, preferably at least $22 \times 10^{-3}$ rad, providing for such displacement quantities and deformation tracking. In the "Performance Test and Evaluation Methodology for Wood-Frame Load-bearing walls and Their Co-efficient of effective wall length", when the load does not decrease even when the load exceeds $1/15$ rad in the in-plane shear test, the ultimate displacement ($\delta u$) is set at $1/15$ rad when the ultimate displacement value cannot be obtained. Therefore, the maximum value of the ultimate displacement ($\delta u$) is $1/15$ rad ($66.7 \times 10^{-3}$ rad).

The present invention further provides a method of constructing a wooded load-bearing wall (claim 5) in which the gypsum-based load-bearing board is fastened to the wooden wall base of a wooden framework construction method or a framework wall construction method by the fastening device. According to the method of constructing the load-bearing wall, it is possible to increase the short-term reference shear strength ($P_0$) by improving the toughness and the deformation tracking of the gypsum-based board, and at the same time, to reduce the specific gravity and/or the plate thickness of the gypsum-based load-bearing board, thereby reducing the weight of the load-bearing wall, improving the workability of the load-bearing wall, or reducing the wall thickness. In the in-plane shear test of the load-bearing wall structure constructed by this method, the load-bearing wall exhibits the ultimate displacement ($\delta u$) of a value greater than at least $20 \times 10^{-3}$ rad, preferably the ultimate displacement ($\delta u$) of a value greater than or equal to $22 \times 10^{-3}$ rad, and thus the load-bearing wall possesses the toughness and the deformation tracking corresponding to such ultimate displacement ($\delta u$).

In another aspect, the present invention relates to a method of increasing a co-efficient of effective wall length of a wooden load-bearing wall in which a gypsum-based load-bearing board is fastened to a wooden wall base used in a wooden framework construction method or a framework wall construction method by a fastener, wherein the load-bearing board is constituted by a main member or a core member formed from a board-shaped hardened gypsum containing inorganic fibers and organic-based strength enhancers that exert a lateral nail resistance of 500 N or more, and a paper covering at least front and back sides of the main member or core member, wherein a surface density or a surface weight of the load-bearing board specified as a mass per unit area of the wall surface is reduced to 6.5 kg/m$^2$ to 8.9 kg/m$^2$, wherein an ultimate displacement (δu2) of the load-bearing wall measured by an in-plane shear test using a test piece with a wall length of 1.82 m is greater than 20×10$^{-3}$ rad (δu2), wherein a correction value (Pu') is greater than 7.6 kN as the correction value (Pu') of the ultimate strength (Pu) determined based on the ultimate strength (Pu) and the plasticity (μ) of the load-bearing wall measured by the in-plane shear test (claim 9).

The thickness of the gypsum-based load-bearing board is preferably 10 mm or less (8.5 mm or more), for example, the thickness is set to be 9.5 mm or 9.0 mm, and the specific gravity of the gypsum-based board is set to be 0.96 or less (0.65 or more) (furthermore preferably 0.8 or less).

Effects of the Invention

According to the gypsum-based load-bearing board of the present invention, the surface density is reduced to improve the toughness and the deformation tracking of the gypsum-based load-bearing board, thereby increasing the ultimate strength (Pu') and the short-term reference shear strength (P$_0$). Therefore, the co-efficient of effective wall length can be increased without increasing the specific gravity and/or the plate thickness of the gypsum-based board without additionally using the reinforcement materials or stiffening materials. Moreover, since the gypsum-based load-bearing board of the present invention is covered with a paper on at least the front and the back sides of the main material or the core material, the gypsum-based load-bearing board can be easily manufactured by a conventional gypsum board manufacturing line.

Further, according to the load-bearing wall structure of a wooden construction building of the present invention, it is possible to reduce the weight of the load-bearing wall or reduce the wall thickness by increasing the co-efficient of effective wall length and reducing the specific gravity and/or the plate thickness of the gypsum-based load-bearing board.

Further, according to a load-bearing wall construction method of a wooden construction building of the present invention, not only increasing co-efficient of effective wall length, but also improving workability or the like of the load-bearing wall by reducing the specific gravity and/or plate thickness of the gypsum-based load-bearing board.

Further, according to the method of increasing the co-efficient of effective wall length of the present invention, the toughness and the deformation tracking of the gypsum-based board are improved while obtaining the minimum physical properties (lateral nail resistance=500 N or more) as the gypsum-based load-bearing board and obtaining the maximum load-bearing strength (maximum load) by reducing the surface density, thereby increasing the ultimate load-bearing strength (correction value) (Pu'). Accordingly, the co-efficient of effective wall length can be increased without relying on reinforcement or stiffness by reinforcement materials or stiffening materials that are additionally provided on the gypsum-based board and without relying on increasing the specific gravity and/or the plate thickness of the gypsum-based board.

BRIEF DESCRIPTION OF THE DRAWINGS

FIG. 2 is a front view illustrating of a structure of a load-bearing wall test piece used in an in-plane shear test for the load-bearing wall structure illustrated in FIG. 1;

FIG. 3 is a diagram illustrating the physical properties and compounding of a gypsum plate of Examples and Comparative Example of the present invention;

FIG. 4 is a diagram illustrating the load-deformation angle curve obtained by the in-plane shear test. FIG. 4(A) illustrates the in-plane shear test results of the gypsum plate of Comparative Example in the present invention, and FIG. 4(B) illustrates the in-plane shear test results of the gypsum plate of Examples in the present invention;

FIG. 5 is a diagram illustrating an envelope made based on the load-deformation angle curve illustrated in FIG. 4.

DETAILED DESCRIPTION OF THE INVENTION

Hereinafter, the structure of the load-bearing wall of the preferred embodiment of the present invention will be described in detail with reference to the accompanying drawings.

Figure 1:
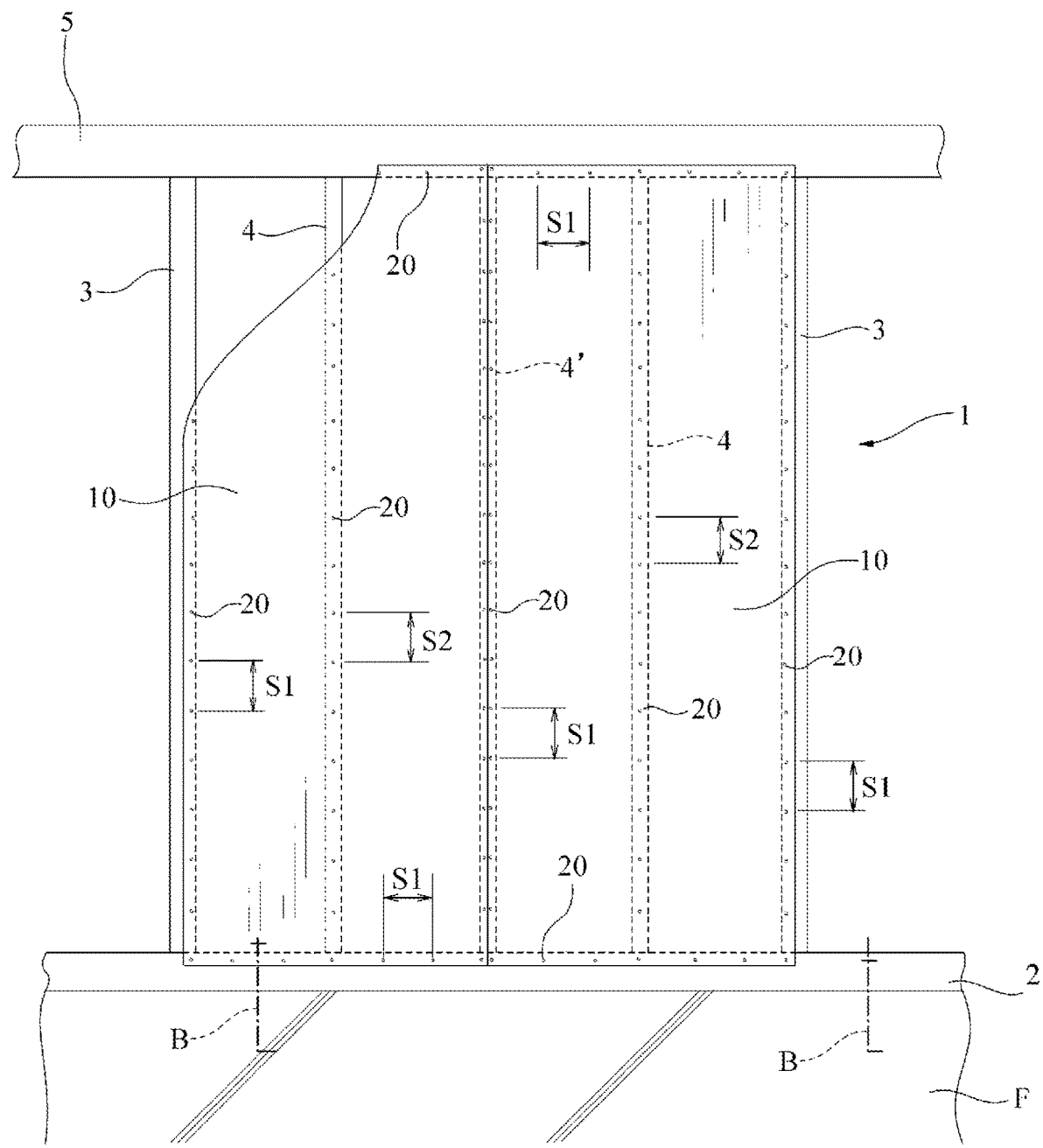
FIG. 1 is a front view schematically illustrating a structure of a load-bearing wall of a wooden construction building.
Figure 6:
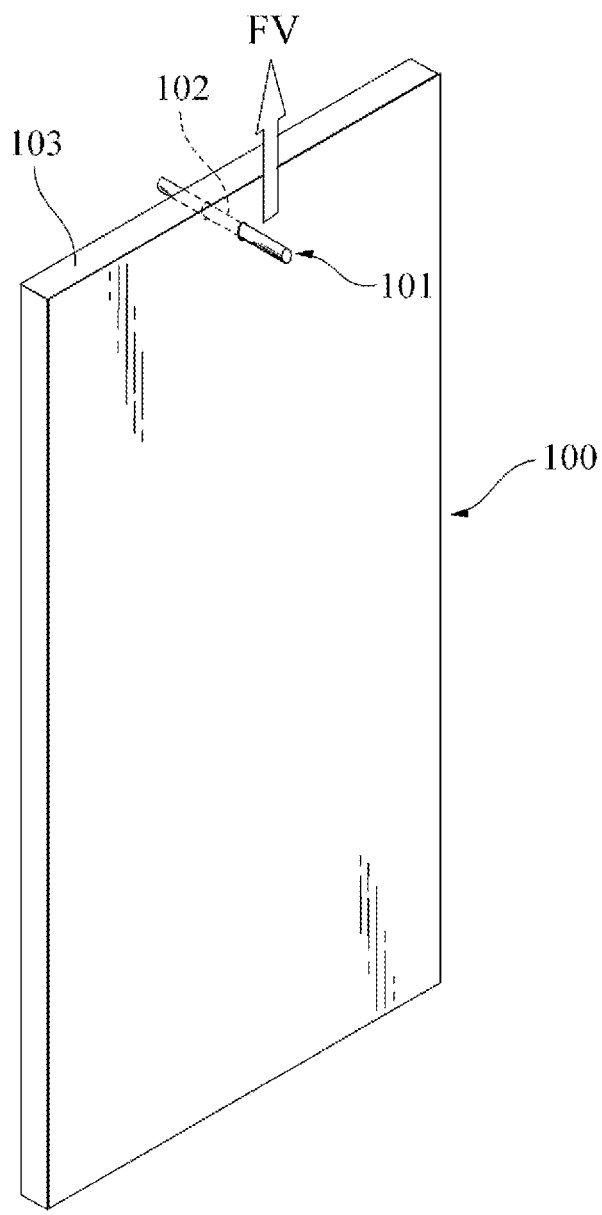
FIG. 6 is a perspective view illustrating a summary of the lateral nail resistance test specified in JIS A 6901.

FIG. 1 is a front view schematically illustrating a structure of a load-bearing wall of a wooden construction building.

The load-bearing wall 1 illustrated in FIG. 1 is a wooden structural load-bearing wall of the wooden framework construction method constructed by obtaining the load-bearing board 10 to a wooden frame on a fabric foundation F of the reinforced concrete (RC) structure. The load-bearing board 10 has dimensions of 9.5 mm in thickness, 910 mm in width, and about in a range from 2,800 to 3,030 mm in height (e.g., 2,900 mm) and has a surface density in the range from 6.5 kg/m$^2$ to 8.9 kg/m$^2$ (e.g., a surface density of 7.1 kg/m$^2$). The surface density (also called the surface weight) is the mass (weight) per unit area of the wall in front view of the wall. The load-bearing board 10 is a gypsum-based board that is constituted from a board-shaped gypsum core (gypsum core material) containing a predetermined amount of inorganic fiber (glass fiber) and an organic strength enhancer (starch) and a base paper (paper) for a gypsum board that covers both sides of the gypsum core.

The load-bearing wall 1 has a foundation 2 secured to the upper surface of the fabric foundation F by anchor bolts B. The load-bearing wall 1 is generally constituted from the foundation 2, pillars 3 placed vertically on the foundation 2 at predetermined intervals, studs 4 and joint pillar 4', a lateral frame (beams, girts, outriggers, and gable outriggers) 5 supported on the upper end (or intermediate portion) of the pillars 3, and the aforementioned load-bearing board 10. The foundation 2, the pillars 3, the studs 4, the joint pillar 4', and the lateral frame 5 constituting the framework are wood (square timber) of the cross-section of the member employed in conventional wooden construction buildings.

The load-bearing board 10 is secured to the foundation 2, the pillars 3, the studs 4, the joint stud 4', and the lateral frame 5 by nails 20. The nails 20 are, for example, a plated iron nail (NZ nail: JIS A 5508). In this example, the nails 20 are used, for example, NZ50 nails (50 mm in length, 6.6 mm in head diameter, and 2.75 mm in shaft diameter). The nails 20 are spaced S1 apart in the four outer circumferential areas of the load-bearing board 10 and spaced S2 apart in the central area of the load-bearing board 10 extending vertically. Preferably, the spacing S1 is set to a dimension in the range from 50 mm to 200 mm (e.g., 75 mm), and the spacing S2 is set to a dimension in the range from 50 mm to 300 mm (e.g., 150 mm).

The gypsum core of the load-bearing board 10 contains a predetermined amount of inorganic fibers and organic strength enhancers and has a lateral nail resistance of 500 N or more. An amount of inorganic fibers is 0.3 to 5 parts by weight, preferably 2 to 4 parts by weight based on 100 parts by weight of calcined gypsum. Examples of the inorganic fibers compounded include glass fibers, carbon fibers, and the like. If the glass fibers are used, glass fibers having 5 to 25 μm in diameter and 2 to 25 mm in length may be suitably used. Further, the amount of the organic strength enhancer compounded is 0.3 to 15 parts by weight, and preferably 1 to 13 parts by weight per 100 parts by weight of calcined gypsum. Examples of the organic strength enhancers compounded include starch, polyvinyl acetate, polyvinyl alcohol, polyacrylic, and the like. As starch, both unprocessed starch and processed starch may be used. The processed starches include starches that have been physically, chemically, or enzymatically treated. As the physically treated starch, a-modified starch may be preferably used. As the chemically treated starch, oxidized starch, phosphate esterified starch, urea phosphate esterified starch, hydroxyethylated starch, hydroxypropylated starch, and acetylated starch may be preferably used.

The composition and structure of the load-bearing board 10 are similar to that of the "structural gypsum board" defined in JIS A 6901. However, the surface density of the load-bearing board 10 is in the range from 6.5 kg/m$^2$ to 8.9 kg/m$^2$ (e.g., 7.1 kg/m$^2$). Accordingly, the load-bearing board 10 is basically different from the "Structural Gypsum Board" of JIS A 6901, which requires a surface density of 9.4 kg/m$^2$ or more as described above. In addition, although the "reinforced gypsum board" specified in JIS A 6901 is known, the load-bearing board 10 is basically different from the "reinforced gypsum board" because the surface density of the "reinforced gypsum board" is 9.4 kg/m$^2$ or more. In addition, the load-bearing board 10 differs from other "gypsum boards" in terms of having a main or core material that is compounded with inorganic fibers and organic strength enhancer to provide lateral nail resistance of 500 N or more. That is, the load-bearing board 10 does not correspond to any "gypsum board" specified in the current JIS A 6901. In this specification, the load-bearing board 10 is specified or expressed as a "gypsum-based board" or "gypsum plate".

Generally, gypsum-based board (including "gypsum boards") are manufactured by a general-purpose gypsum board manufacturing apparatus. A gypsum board manufacturing apparatus includes a mixer for preparing gypsum slurry by mixing raw materials such as a calcined gypsum, an auxiliary adhesive, a curing accelerator, foams (or foam agents) with kneading water required for slurring the calcined gypsum as described in WO 2019/058936, for example. The gypsum slurry is cast onto a gypsum board base paper (bottom sheet) on a conveyor belt of a gypsum board manufacturing apparatus, and the gypsum board base paper (top sheet) is laminated onto the gypsum slurry. The consecutive laminate of the strip-like and three-layer structure thus formed is processed by the gypsum board manufacturing device including a coarse cutting device, a forced drying device, a cutting device, or the like, and formed into a gypsum-based board having a predetermined dimension of a gypsum product, i.e., both sides of a hardened body of the gypsum slurry (i.e., a gypsum core) covered with a base paper for a gypsum board. The specific gravity of the gypsum-based board is controlled primarily by the amount of foam in the gypsum slurry.

With respect to the wooden structural load-bearing wall using the structural gypsum board, reinforced gypsum board, and (regular) gypsum board as the load-bearing board specified in JIS A 6901, the co-efficient of effective wall length of the load-bearing board of okabe-zukuri of the wooden framework structure as specified in the aforementioned Ministry of Construction Notification No. 1100 is as follows.

Structural gypsum board (Class A) 1.7
Structural gypsum board (Class B) 1.2
Reinforced gypsum board 0.9
(Regular) gypsum board 0.9

In addition, an example of the co-efficient of effective wall length (Load-bearing walls with a vertical frame spacing of more than 50 cm) of the load-bearing walls for framework wall constructions specified in the aforementioned Ministry of Land, Infrastructure, Transport and Tourism Notification No. 1541 is as follows.

Structural gypsum board (Class A) 1.7
Structural gypsum board (Class B) 1.5
Reinforced gypsum board 1.3
(Regular) gypsum board 1.0

Thus, the co-efficient of effective wall lengths specified in the Ministry of Construction or Ministry of Land, Infrastructure, Transport and Tourism Notification are generally acceptable without performing individual performance tests. However, when new materials are used or when co-efficient of effective wall length other than the above is used, it is necessary to set the co-efficient of effective wall length by performing the performance tests described above.

As mentioned above, the above-mentioned structural gypsum boards and reinforced gypsum boards specified in JIS A 6901 require physical properties with a surface density of 9.4 kg/m$^2$ or more and a specific gravity of 0.75 or more. This is considered to be an important condition for increasing the maximum load that the board can withstand and ensuring a high short-term allowable shear strength (and thus a high co-efficient of effective wall length) of wooden structural load-bearing walls. In particular, in structural gypsum board, which exhibits higher lateral nail resistance than reinforced gypsum board, it has been thought that the surface density and specific gravity of a gypsum board for structural use cannot be reduced. In other words, obtaining the physical properties with a surface density of 9.4 kg/m$^2$ or more and a specific gravity of 0.75 or more was considered to be a prerequisite for further increasing the co-efficient of effective wall length of the load-bearing wall test (wooden structure load-bearing wall) obtained in the in-plane shear test described above. However, in recent experiments by the inventors of the present invention, it has been found that, in the gypsum-based board having a physical property (lateral nail resistance) comparable to that of the structural gypsum board by adding an inorganic fiber or an organic-based strength enhancer, the plate thickness of the board is reduced, or the foam amount is adjusted to reduce the specific gravity of the gypsum core, thereby reducing the surface density, and as a result, the toughness or the deformation tracking potentially possessed by the board itself becomes apparent. As a result, the ultimate strength of the board can be effectively utilized and the plasticity of the board can be increased, thereby further improving the short-term allowable shearing strength of the wooden structure load-bearing wall. The inventors of the present invention have arrived at the present invention based on the findings obtained from such experiments. Hereinafter, the experiment (in-plane shear test) performed by the inventors will be described in detail.

FIG. 2 is a front view illustrating of a structure of a load-bearing wall test piece used in an in-plane shear test for the load-bearing wall structure illustrated in FIG. 1. FIGS. 3 to 5 are diagrams illustrating the test results of in-plane shear tests. In FIG. 2, the components or members of the bearing wall test piece corresponding to or similar to the components or members illustrated in FIG. 1 are designated by the same reference numerals.

The inventors of the present invention manufactured a load-bearing wall test piece with a wall width of 1,820 mm and a height of 2,730 mm illustrated in FIG. 2 (hereinafter, simply referred to as the "test piece") as a test piece of the load-bearing wall structure illustrated in FIG. 1, and performed an in-plane shear test using a non-loading test device in accordance with the test piece specification described in the "Performance Test and Evaluation Methodology for Wood-Frame Load-bearing walls and Their Co-efficient of effective wall length".

The test piece illustrated in FIG. 2 has the main structure of a wooden framework assembly including a cedar foundation 2 and pillars 3 with a cross-section of 105 mm×105 mm; and a lateral frame 5 of pine lumber with a cross-section of 180 mm×105 mm supported by the pillars 3. In the center between the pillars 3, a cedar joint stud 4' with a cross-section of 45×105 mm is disposed, and cedar studs 4 with a cross-section of 27 mm×105 mm are disposed between the pillars 3 and the joint stud 4'. Cedar or pine lumber of noggings 5' are disposed between the pillars 3 and the studs 4 and is also provided between the studs 4 and the joint stud 4'. As a test jig, a pull-on bracket 40 is provided at the joint of the foundation 2 and the pillars 3 and is also provided at the joint of the lateral frame 5 and the pillars 3. The foundation 2, the pillars 3, the joint stud 4', the studs 4, the lateral frame 5, and the noggings 5' constitute the framework members of the load-bearing wall structure, and rectangular-shaped framework assemblies are formed by these members (framework members).

In the test piece illustrated in FIG. 2, the length between the foundation 2 and the beam 3 in the vertical direction h1, the length between the foundation 2 and the noggings 5' in the vertical direction h2, and the relative length of the beam 3 with respect to the noggins 5' in the vertical direction h3 were set to be h1=2,625 mm, h2=1,790 mm, and h3=835 mm, respectively. The distance between the pillar 3 and the joint stud 4' (distance between the core pillars) w1 was set to be w1=910 mm. The wall length L was set to be 1.82 m. The board 10 is divided into upper and lower sections by the noggings 5', the lower board 10a having a dimension of 910 mm in width and 1,820 mm in height, and the upper board 10b having a dimension of 910 mm in width and 865 mm in height. The overlapped length h4 and h5 of the boards 10a and 10b were set at 30 mm.

In the test piece illustrated in FIG. 2, the nails 20 for fastening the boards 10a and 10b to the foundation 2, the pillars 3, the joint stud 4', the lateral frame 5, and the noggings 5' were arranged at equal intervals (space S1=75 mm) throughout the peripheral portion of the boards 10a and 10b. The nails 20 for fastening the boards 10a and 10b to the studs 4 were arranged at equal intervals (space S2=150 mm) in the vertical center zone of the boards 10a and 10b. NZ50 nails (50 mm in length, 6.6 mm in head diameter, and 2.75 mm in shaft diameter) were used as the nails 20.

The present inventors manufactured gypsum plates according to Examples 1 to 5 and Comparative Example illustrated in FIG. 3 as samples and performed in-plane shear tests using a non-loaded test apparatus. As described above, the gypsum plates according to Examples 1 to 5 are a gypsum-based board including a sheet-shaped gypsum core (gypsum core material) containing a predetermined amount of inorganic fibers (glass fibers) and an organic strength enhancing material (starch) and a base paper (paper) for the gypsum plate covering both sides of the gypsum core. The board of Comparative Example is a gypsum-type board equivalent to the EX board (9.5 mm in plate thickness) described above, which is equivalent to the gypsum plate of Examples 1 to 5, or is composed of a board-shaped gypsum core (gypsum core material) containing less amount of inorganic fiber (glass fiber) and an organic strength enhancer (starch) than that of Examples 1 to 5, and a base paper (paper member) for a gypsum board covering both sides of the gypsum core. As illustrated in FIG. 3, the gypsum plates of Examples 1 to 5 have a surface density in the range from 7.3 to 8.7 kg/m$^2$, and the gypsum plate of Comparative Example has a surface density of 9.8 kg/m$^2$.

The ultimate displacement δu2 of the gypsum plates in Examples 1 to 5 obtained by the in-plane shear test was in a range from $26.8 \times 10^{-3}$ rad to $36.0 \times 10^{-3}$ rad, and the ultimate displacement δu1 of the gypsum plate of Comparative Example obtained by the in-plane shear test was $20.0 \times 10^{-3}$ rad. As illustrated in FIG. 3, in the gypsum plates of Examples 1 to 5 and the gypsum plate in Comparative Example, the yield strength Py was greater than the ultimate strength (correction value) Pu'. Therefore, the short-term reference shear strength $P_0$ and the co-efficient of effective wall length were specified by the ultimate strength (correction value) Pu'. In the gypsum plates of Examples 1 to 5, the value of the ultimate strength (correction value) Pu' was larger than that of the gypsum plate of Comparative Example, and the difference between the yield strength Py and the ultimate strength (correction value) Pu' was less than 2.0 kN (1.6 or less), indicating that the difference between the yield strength Py and the ultimate strength (correction value) Pu' was relatively small. That is, as far as reference is made to the test results illustrated in FIG. 3, in both Comparative Example and Examples 1 to 5, the ultimate strength (correction value) Pu' is relatively smaller than the yield strength Py. However, in Examples 1 to 5, the difference between the yield strength Py and the ultimate strength (correction value) Pu' is reduced, and a tendency for both to level off numerically is observed. Since the load-bearing (load) and displacement (shear deformation angle) of each gypsum plate of Examples 1 to 5 obtained by the in-plane shear test have substantially the same tendency or characteristics, the characteristics of the gypsum plate of the present invention will be described below based on the test results of the gypsum plate of Example 1, which indicates generally intermediate ultimate displacement ($33.1 \times 10^{-3}$ rad).

FIG. 4 is a diagram illustrating the load-deformation angle curve obtained by the in-plane shear test. FIG. 4(A) illustrates the in-plane shear test result of the gypsum plate in Comparative Example. FIG. 4(B) illustrates the in-plane shear test result of the gypsum plate in Example 1. FIG. 5 is a diagram illustrating an envelope created based on the load-deformation angle curve illustrated in FIG. 4. The envelope is a characteristic line of the load (load-bearing)

and displacement (shear deformation angle) based on the load-deformation angle curve on the side that ultimately lead to breakage.

As illustrated in FIG. 4(A), the gypsum plate of Comparative Example reached the maximum load (maximum load-bearing) Pmax at the deformation angle=about $20\times10^{-3}$ rad, but was substantially broken by the subsequent horizontal force acting immediately thereafter. As a result, the load (load-bearing) of the gypsum-based board immediately dropped to a value less than 0.8 Pmax. In FIG. 4(A), the load level at the maximum load Pmax is indicated by a dashed-and-dotted line, and the load level at 0.8 Pmax load drop range is indicated by a dashed-and-double dotted line. In FIG. 4(A), the load-deformation angle curve during repeated application just after the maximum load Pmax is indicated below the load level at 0.8 Pmax that illustrated by the dashed-and-double dotted line. This curve is specified by the load difference $\Delta P$ with the 0.8 Pmax load level.

As illustrated in FIGS. 4(A) and 5, when the gypsum plate in Comparative Example, the gypsum plate is broken at the deformation angle=about $20\times10^{-3}$ rad at once at the time of maximum load Pmax, so that the ultimate displacement $\delta u1$ is substantially equal to the deformation angle at the time of the maximum load Pmax. Therefore, it is not possible to increase the short-term allowable shear strength of the gypsum plate relying on the toughness or deformation tracking of the gypsum plate. In order to increase the short-term allowable shear strength of the gypsum plate, it is necessary to increase the surface density and increase the maximum load, which had been recognized as virtually the only method to increase co-efficient of effective wall length. However, as is obvious from the load-deformation angle curve of Example 1 illustrated in FIG. 4(B) and FIG. 5, when the surface density is reduced while obtaining the minimum physical properties (lateral nail resistance: 500 N or more) as the gypsum-based load-bearing board, the potential properties such as toughness or deformation tracking of the gypsum plate itself become obvious, and as a result, the short-term reference shear strength $P_0$ can be specified based on the ultimate strength Pu and the plasticity u. This point will be further described below.

As illustrated in FIG. 4(B), the gypsum plate of Example 1 was reached to a maximum load (maximum load-bearing) at a deformation angle=about $20\times10^{-3}$ rad. After that, applying force repeatedly caused the deformation angle in the 0.8 Pmax load reduction zone, i.e., the ultimate displacement $\delta u2$ was obtained as the ultimate displacement $\delta u2=33.1\times 10^{-3}$ rad. As described above, the ultimate displacement $\delta u2$ of each gypsum plate of Examples 1 to 5 is within the range from $26.8\times10^{-3}$ rad to $36.0\times10^{-3}$ rad as illustrated in FIG. 3, and the ultimate displacement $\delta u2$ generally equivalent to that of Example 1 was obtained in Examples 2 to 5. That is, after the gypsum plates of Examples 1 to 5 reached to the maximum load (maximum load-bearing) at the deformation angle=about $20\times10^{-3}$ rad, the plastic deformation by the repeated force was continued until causing about 1.3 to 1.8 times deformation angles of the deformation angle at the maximum load Pmax. Accordingly, the plasticity u was relatively largely increased.

As explained at the beginning of this specification, the co-efficient of effective wall length is the value obtained by dividing the short-term allowable shear strength Pa by the predetermined reference shear strength (L×1.96. The short-term allowable shear strength Pa is the value obtained by multiplying the short-term reference shear strength $P_0$ by the predetermined reduction coefficient $\alpha$, as can be understood from the equation illustrated in FIG. 5. Similar to many previous in-plane shear tests of gypsum-based boards, the short-term reference shear strength $P_0$ of each Example and Comparative Example is specified as a value determined by multiplying the correction value of the ultimate strength Pu (i.e., the ultimate strength (correction value) Pu') obtained by correction based on the plasticity u by the variation coefficient $\beta$. Accordingly, the short-term reference shear strength $P_0$ is proportional to the value of the ultimate strength Pu and increases in conjunction with the increase in plasticity $\mu$, as can be readily understood from the equation of FIG. 5. The plasticity $\mu$ is proportional to the ultimate displacement $\delta u$, and the short-term reference shear strength $P_0$ increases in conjunction with the increase in the ultimate displacement $\delta u$ if the yield displacement $\delta v$ is assumed to be almost the same value. That is, by increasing the ultimate displacement $\delta u$, the short-term reference shear strength $P_0$ can be increased. In order to simplify the explanation, the variation coefficient $\beta$ is assumed to be 1.0.

As illustrated in the table in FIG. 5, the short-term reference shear strength $P_0$ obtained from the gypsum plate of Example 1 is significantly greater than the value of the short-term reference shear strength $P_0$ obtained from the gypsum plate of Comparative Example. This means that the ultimate displacement $\delta u2$ is increased by the decrease in surface density, thereby increasing the short-term reference shear strength $P_0$. As a result, this means that an increased co-efficient of effective wall length is obtained. It should be noted that the reduction coefficient $\alpha$ is a value artificially set, and by multiplying the short-term reference shear strength $P_0$ by the reduction coefficient $\alpha$, a short-term allowable shear strength (Pa) is obtained, thereby obtaining the final co-efficient of effective wall length value. For example, if the reduction coefficient is set to 0.75, the co-efficient of effective wall length of the wooden structural load-bearing wall using the gypsum plate of Example 1 is 2.25, which is approximately 1.4 times the co-efficient of effective wall length (1.60) of Comparative Example. The value of the co-efficient of effective wall length is significantly larger than the co-efficient of effective wall length (co-efficient of effective wall length of the aforementioned: 0.9 to 1.7) of the wooden structural load-bearing walls such as structural gypsum boards specified in Ministry of Construction Notification No. 1100 and the like.

As described above, according to the load-bearing wall 1 of the above-described structure, the load-bearing board 10 is composed of a main material or a core material formed from a board-shaped hardened gypsum containing inorganic fibers and organic-based strength enhancers to exert the lateral nail resistance of 500 N or more, and a paper covering at least the front and back sides of the main material or the core material. The surface density or the surface weight of the load-bearing board 10 specified as the mass per unit area of the wall is set at a value within the range of 6.5 kg/m² to 8.9 kg/m². The ultimate displacement $\delta u2$ of the load-bearing wall 1 obtained by the in-plane shear test using a load-bearing wall test piece with a wall length of 1.82 m is, for example, $33.1\times10^{-3}$ rad (Example 1), which is greater than $20\times10^{-3}$ rad (Comparative Example). The ultimate strength (Correction value) Pu' obtained by the in-plane shear test is, for example, 10.7 kN (Example 1), which is greater than 7.6 kN (Comparative Example). Assuming that the variation coefficient $\beta$ is 1, the short-term allowable shear strength Pa is, for example, 10.7 kN (Example 1), which is greater than 7.6 kN (Comparative Example). The co-efficient of effective wall length is, for example, 2.25 (Example 1), which is greater than 1.60 (Comparative Example). Thus, according to the load-bearing wall 1 having the structure in which the load-bearing board 10 is fastened to the wooden wall base of the wooden framework construction method by the nails 20, the short-term reference shear strength $P_0$ can be increased and the co-efficient of effective wall length can be increased without additionally using the reinforcement materials or stiffening materials, without increasing the specific gravity and/or the plate thickness of the load-bearing board 10, by improving the toughness and deformation tracking of the gypsum-based board and increasing the ultimate strength (correction value) Pu' while obtaining the minimum physical properties (lateral nail resistance=500 N or more) as a gypsum-based load-bearing board.

While the preferred embodiments and Examples of the present invention have been described in detail, the present invention is not limited to the above-described embodiments and Examples, and that various modifications or variations may be made within the scope of the present invention as defined in the claims.

For example, the above-described embodiments and Examples relate to first floor level bearing walls of a wooden construction building, but the present invention is equally applicable to second or third floor level bearing walls. In the case of the second or third floor level bearing walls, the lower end of the bearing board is fastened to the second or third floor level lateral frame material.

The above-described embodiments and Examples relate to the wooden framework construction method and the load-bearing wall structure of Okabe-zukuri. However, the present invention may be applied to a Shinkabe-zukuri, a Yukagachi (floor preceding method), and Okabe-zukuri of a wooden framework construction method. Alternatively, the present invention may be applied to a load-bearing wall structure of a framework wall construction method. In this case, a load-bearing board is fastened to a vertical frame, a lower frame, an upper frame, or the like, instead of a foundation, pillars, and lateral frames.

In addition, the test piece illustrated in FIG. 4 has a structure in which a gypsum plate is divided into upper and lower portions and noggings are arranged at an intermediate position in the height direction, but an in-plane shear test may be performed using a gypsum plate of substantially the same height as the total height of the wooden framework assembly. In the latter case, it is considered that the short-term reference shear strength may be increased.

Also, in the above-described embodiments and Examples, the load-bearing board is fastened to the wooden framework assembly, such as pillars, lateral frames, and the like, by nails, but the load-bearing board may be fastened to the wooden framework assembly by other types of fasteners, such as screws.

INDUSTRIAL APPLICABILITY

The present invention is applied to gypsum-based load-bearing boards in wooden construction buildings. In particular, the present invention is applied to a gypsum-based load-bearing board, in which the load-bearing board is constituted by a main member or a core member formed from a board-shaped hardened gypsum containing inorganic fibers and organic-based strength enhancers that exert a lateral nail resistance of 500 N or more, and a paper covering at least front and back sides of the main member or core member. The present invention is also applied to a method of increasing a co-efficient of effective wall length of a wooden structural load-bearing wall using such gypsum-based load-bearing board. The present invention further applies to a load-bearing wall structure and a load-bearing wall construction method of a wooden construction building configured to fasten such gypsum-based load-bearing board to a wooden framework wall base by a wooden framework wall construction method or a framework wall construction method, thereby integrally retaining the load-bearing board by a wooden wall base. According to the present invention, the practical value or effect thereof is significant since the co-efficient of effective wall length of the wooden structural load-bearing wall can be increased without additionally using the reinforcement materials or stiffening materials and without increasing the specific gravity and/or plate thickness of the gypsum-based board.

EXPLANATION OF REFERENCE NUMERALS

1 Load-bearing wall
2 Foundation
3 Pillar
4 Stud
4' Joint stud
5 Lateral frame (beams, girts, outriggers, and gable outriggers)
5' Nogging
10, 10a, and 10b Gypsum-based load-bearing board
20 Nails (fasteners]

The invention claimed is:

1. A wooden load-bearing wall having a gypsum-based load-bearing board comprising:
a main member or a core member formed from a board-shaped hardened gypsum containing an inorganic fiber including glass fibers and an organic-based strength enhancer including starch that exert a lateral nail resistance of 500 N or more, the inorganic fiber being 0.3 to 5 parts by weight based on 100 parts by weight of calcined gypsum, and the organic-based strength enhancer being 0.3 to 15 parts by weight based on 100 parts by weight of calcined gypsum, and a paper covering at least front and back sides of the main member or the core member, the main member and the paper or the core member and the paper constituting the load-bearing board, and a plate thickness of the gypsum-based load-bearing board being less than 12 mm.

2. The wooden load-bearing wall according to claim 1, wherein a measurement value of a yield strength (Py) by an in-plane shear test using a load-bearing wall test piece having a wall width of 1,820 mm and a height of 2,730 mm is greater than 7.6 kN.

3. The wooden load-bearing wall according to claim 1, wherein a correction value (Pu') of an ultimate strength (Pu) is 8.0 kN or more, a measurement value of a yield strength (Py) of the load-bearing wall measured by an in-plane shear test using a load-bearing wall test piece having a wall width of 1,820 mm and a height of 2,730 mm is 8.0 kN or more, or both the correction value (Pu') and the measurement value of the yield strength (Py) are 8.0 kN or more.

4. The wooden load-bearing wall according to claim 1, wherein a specific gravity of the gypsum-based load-bearing board is set to be 0.96 or less.

5. A method of constructing a wooden load-bearing wall fastening a gypsum-based load-bearing board to a wooden wall base used in a wooden framework construction method or a framework wall construction method by a fastener, the method comprising:
fastening the gypsum-based load-bearing board to the wooden wall base, in which the gypsum-based load-bearing board is constituted by a main member or a core member formed from a board-shaped hardened gypsum containing an inorganic fiber including glass fibers and an organic-based strength enhancer including starch that exert a lateral nail resistance of 500 N or more, the inorganic fiber being 0.3 to 5 parts by weight based on 100 parts by weight of calcined gypsum, and the organic-based strength enhancer being 0.3 to 15 parts by weight based on 100 parts by weight of calcined gypsum, and a paper covering at least front and back sides of the main member or the core member, the main member and the paper or the core member and the paper constituting the load-bearing board, and a plate thickness of the gypsum-based load-bearing board being less than 12 mm.

6. The method according to claim 5, wherein a specific gravity of the gypsum-based load-bearing board is set to be 0.96 or less.

7. The method according to claim 5, wherein a measurement value of a yield strength (Py) as measured by an in-plane shear test using a load-bearing wall test piece having a wall width of 1,820 mm and a height of 2,730 mm is greater than 7.6 kN.

8. The method according to claim 5, wherein a correction value (Pu') of an ultimate strength (Pu) is increased to 8.0 kN or more, a measurement value of a yield strength (Py) measured by an in-plane shear test using a load-bearing wall test piece having a wall width of 1,820 mm and a height of 2,730 mm is increased to 8.0 kN or more, or the correction value (Pu') is increased to 8.0 kN or more and the measurement value of the yield strength (Py) is 8.0 kN or more.

9. A gypsum-based load-bearing board comprising:
a main member or a core member formed from a board-shaped hardened gypsum containing an inorganic fiber including glass fibers and an organic-based strength enhancer including starch that exert a lateral nail resistance of 500 N or more, the inorganic fiber being 0.3 to 5 parts by weight based on 100 parts by weight of calcined gypsum, and the organic-based strength enhancer being 0.3 to 15 parts by weight based on 100 parts by weight of calcined gypsum, and a paper covering at least front and back sides of the main member or the core member to constitute the load-bearing board, and a plate thickness of the gypsum-based load-bearing board being less than 12 mm.

10. The gypsum-based load-bearing board according to claim 9, wherein a specific gravity of the load-bearing board is set to be 0.96 or less.

11. The gypsum-based load-bearing board according to claim 9, wherein the gypsum-based load-bearing board has a laminated structure in which a surface or a surface layer of the core member is covered with the paper.

12. The gypsum-based load-bearing board according to claim 9, wherein the main material or the core member of the gypsum-based load-bearing board contains an organopolysiloxane compound as an anti-degradation agent to prevent deterioration of the load-bearing strength.

13. The gypsum-based load-bearing board according to claim 9, wherein the gypsum-based load-bearing board has a lateral nail resistance of 980 N or less.

14. The gypsum-based load-bearing board according to claim 9, wherein a measurement value (Py) of a yield strength measured by an in-plane shear test using a load-bearing wall test piece having a wall width of 1,820 mm and a height of 2,730 mm is greater than 7.6 kN.

15. The gypsum-based load-bearing board according to claim 9, wherein a correction value (Pu') of an ultimate strength (Pu) is increased to 8.0 kN or more, a measurement value (Py) of a yield strength measured by an in-plane shear test using a load-bearing wall test piece having a wall width of 1,820 mm and a height of 2,730 mm is increased to 8.0 kN or more, or the correction value (Pu') is increased to 8.0 kN or more and the measurement value (Py) is 8.0 kN or more.

* * * * *